United States Patent
Vanstone et al.

(10) Patent No.: US 7,036,015 B2
(45) Date of Patent: Apr. 25, 2006

(54) VERIFICATION PROTOCOL

(75) Inventors: Scott A. Vanstone, Waterloo (CA); Donald B. Johnson, Manassas, VA (US)

(73) Assignee: Certicom Corp., Mississauga (CA)

( * ) Notice: Subject to any disclaimer, the term of this patent is extended or adjusted under 35 U.S.C. 154(b) by 255 days.

(21) Appl. No.: 10/056,060

(22) Filed: Jan. 28, 2002

(65) Prior Publication Data

US 2002/0152385 A1 Oct. 17, 2002

Related U.S. Application Data

(63) Continuation of application No. 09/015,338, filed on Jan. 29, 1998, now Pat. No. 6,446,207, which is a continuation-in-part of application No. 08/962,441, filed on Oct. 31, 1997, now abandoned.

(30) Foreign Application Priority Data

Jan. 31, 1997 (GB) .................................. 9702063

(51) Int. Cl.
*H04L 9/00* (2006.01)
(52) U.S. Cl. ..................... 713/180; 380/28; 380/30; 713/171
(58) Field of Classification Search ................ 713/180, 713/171; 380/28, 30
See application file for complete search history.

(56) References Cited

U.S. PATENT DOCUMENTS

| | | | |
|---|---|---|---|
| 4,995,081 A | 2/1991 | Leighton et al. | |
| 5,159,632 A * | 10/1992 | Crandall | 380/28 |
| 5,442,707 A | 8/1995 | Miyaji et al. | |
| 5,475,763 A | 12/1995 | Kaufman et al. | |
| 5,600,725 A * | 2/1997 | Rueppel et al. | 380/30 |
| 6,446,207 B1 * | 9/2002 | Vanstone et al. | 713/180 |

FOREIGN PATENT DOCUMENTS

WO   WO 97/02679 A1   6/1996

OTHER PUBLICATIONS

Menezes, A. J., Van Oorschot, P.C., Vanstone, S. A., Handbook of Applied Cryptography, Oct. 17, 1996, pp. 452-460, CRC Press.
Schneier, Bruce, Applied Cryptography: Protocols, Algorithms, and Source Code in C, Oct. 18, 1998, pp. 34-44, 2nd Edition, John Wiley & Sons.
Schnorr, C. P., "Efficient Identification and Signatures For Smart Cards," Advances in Cryptology-CRYPTO '89, Aug. 20-24, 1989, pp. 239-252, vol. 435, Springer-Verlag.

* cited by examiner

*Primary Examiner*—Gilberto Barron, Jr.
*Assistant Examiner*—Jung W. Kim
(74) *Attorney, Agent, or Firm*—Ralph A. Dowell; Dowell & Dowell, P.C.

(57) ABSTRACT

A digital signature verification protocol utilises a pair of signature components incorporating a pair of private keys, one of which is a long term key and the other of which is a short term key.

The long term key is applied to one of the signature components to reveal the short term key.

The short tern key is then used to compute a value of a signature component contained in the signature. If the computed value and received values agree then authenticity is verified.

12 Claims, 5 Drawing Sheets

VERIFICATION PROTOCOL

This application is Continuation of U.S. application Ser. No. 09/015,338 filed on Jan. 29, 1998 now U.S. Pat. No. 6,446,207, which is a Continuation-in-Part of U.S. application Ser. No. 08/962,441 filed on Oct. 31, 1997 now abandoned, the contents of which are incorporated herein by reference, and which claims the priority of UK Application No. 9702063.0 filed on Jan. 31, 1997.

The present invention relates to data transmission and more particularly to data transmission systems to verify the identity of the parties transmitting data.

It is well known to communicate data electronically between a pair of correspondents, typically a pair of computer terminals or a personal card and a computer terminal. Widespread use is made of such communication in the banking environment in order to conduct transactions.

To maintain the integrity of such transactions, it is necessary to implement a system in which the identity of the parties can be verified and for this purpose a number of signature protocols have been developed. Such protocols are based upon El Gamal signature protocols using the Diffie Hellman public key encryption scheme. One commonly used cryptographic scheme is that known as RSA but to obtain a secure transmission, a relatively large modulus must be used which increases the bandwidth and is generally undesirable where limited computing power is available. A more robust cryptographic scheme is that known as the elliptic curve cryptosystem (ECC) which may obtain comparable security to the RSA cryptosystems but with reduced moduli.

Basically, each party has a private key and a public key derived from the private key. Normally for data transfer, a message is encrypted with the public key of the intended recipient and can then be decrypted by that recipient using the private key that is known only to the recipient. For signature and verification purposes, the message is signed with the private key of the sender so that it can be verified by processing with the public key of the stated sender. Since the private key of the sender should only be known to the sender, successful decryption with the sender's public key confirms the identity of the sender.

The El Gamal signature protocol gets its security from the difficulty in calculating discrete logarithms in a finite field. El Gamal-type signatures work in any group including elliptic curve groups. For example given the elliptic curve group $E(F_q)$ then for $P \in E(F_q)$ and $Q=aP$ the discrete logarithm problem reduces to finding the integer a. With an appropriately selected underlying curve, this problem is computationally infeasible and thus these cryptosystems are considered secure.

Various protocols exist for implementing such a scheme. For example, a digital signature algorithm DSA is a variant of the El Gamal scheme. In this scheme a pair of correspondent entities A and B each create a public key and a corresponding private key. The entity A signs a message m of arbitrary length with his private key. The entity B can verify this signature by using A's public key. In each case however, both the sender, entity A, and the recipient, entity B, are required to perform a computationally intensive operations, typically an exponentiation, to generate and verify the signature respectively. Where either party has adequate computing power this does not present a particular problem but where one or both the parties have limited computing power, such as in a "Smart card" application, the computations may introduce delays in the signature and verification process.

There are also circumstances where the Signor is required to verify its own signature. For example in a public key cryptographic system, the distribution of keys is easier than that of a symmetric key system. However, the integrity of public keys is critical. Thus the entities in such a system may use a trusted third party to certify the public key of each entity. This third party may be a certifying authority (CA), that has a private signing algorithm $S_T$ and a verification algorithm $V_T$ assumed to be known by all entities. In its simplest form the CA provides a certificate binding the identity of an entity to its public key. This may consist of signing a message consisting of an identifier and the entity's authenticated public key. From time to time however the CA may wish to authenticate or verify its own certificates.

As noted above, signature verification may be computationally intensive and to be completed in a practical time requires significant computing power. Where one of the correspondents has limited computing capacity, such as the case where a "smart card" is utilized as a cash card, it is preferable to adopt a protocol in which the on card computations are minimized. Likewise, where a large number of signatures are to be verified, a rapid verification facility is desirable.

It is therefore an object of the present invention to provide a signature and verification protocol that facilitates the use of limited computing power for one of the correspondents and verification of the signature.

In general terms, the present invention provides a method of establishin a session key between a pair of correspondents in a data communication system, each of the correspondents sharing a secret information, the method comprising the steps of one of the correspondents generating an additional secret information and deriving therefrom a session key; the one of the correspondents combining the secret information and the additional secret information in a signature algorithm to provide a first signature component; the one of the correspondents deriving a second signature component from the secret information; the one of the correspondents transferring the first and second signature components to the other of the correspondents; the other of the correspondents using the secret information to obtain the additional secret information from the first signature component and generating the session key from the secret information and the additional secret information; and the other of the correspondents verifying the second signature component by operating upon the session key obtained at the other of the correspondents to obtain a value corresponding to the second signature component and comparing such value with the second signature component.

An embodiment of the invention will now be described by way of example only, with reference to the accompanying drawings, in which FIG. 1 is a schematic representation of a data transmission system; and FIG. 2 is a schematic flow chart of a signature verification protocol.

Figure 1:
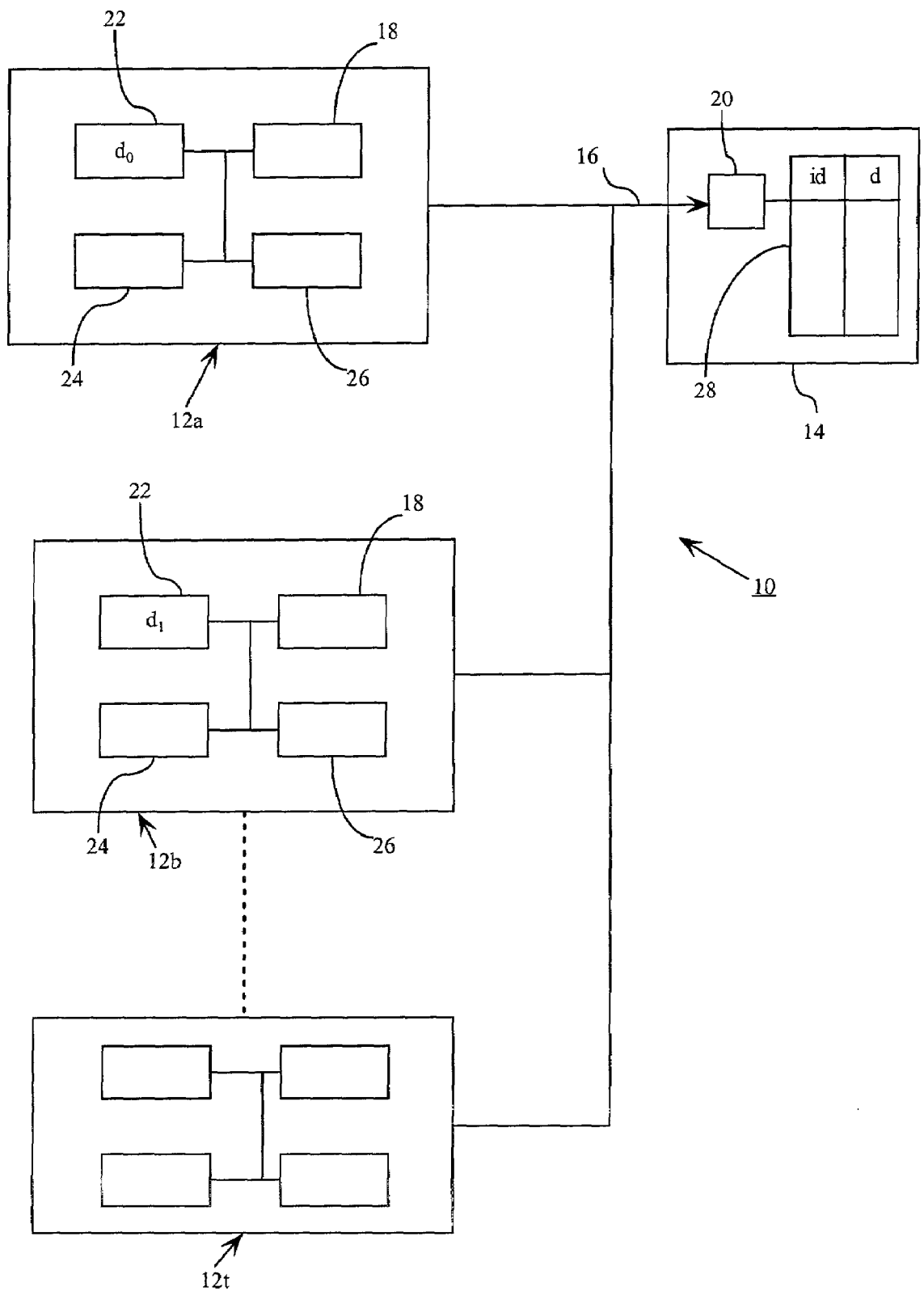
Figure 2:
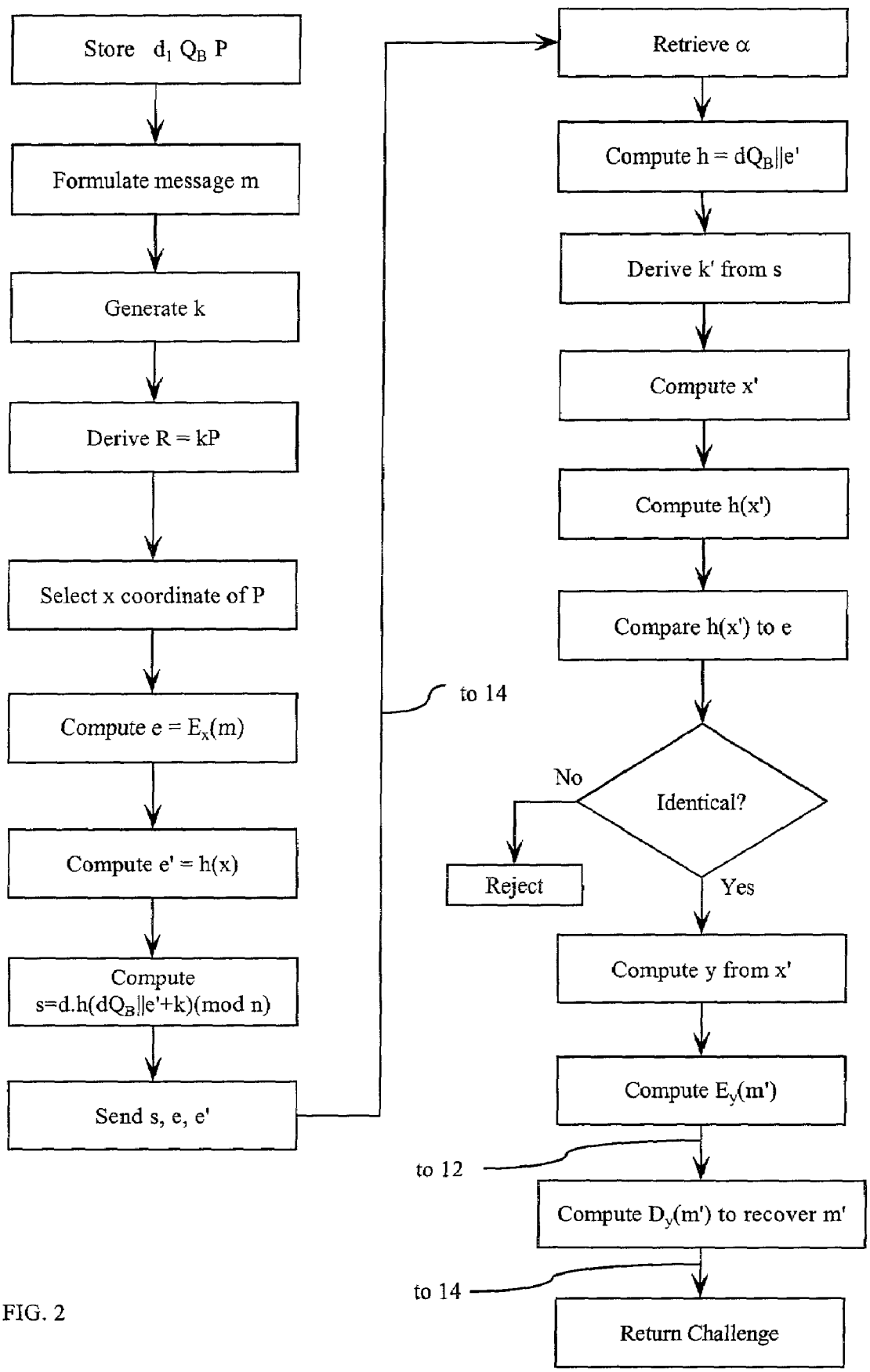

Referring therefore to FIG. 1, a data transmission system 10 includes a plurality of correspondents 12a, 12b, ... 12t, (generically referred to by reference numeral 12) interconnected by a data transmission link 16. The correspondents 12 are typically electronic terminals having a limited computing capacity, and in the present example, the correspondent 12 may be considered to be in the form of a "smart card" having limited memory and computing capacity. The data transmission system 10 also includes a correspondent 14 that in this embodiment may be a terminal in a banking institution, connected by the transmission link 16 to respective ones of the terminals 12. Such connection will typically be on a transient basis as correspondents 12 periodically access the system 10 but may be permanent connections.

The correspondents 12,14 each have encryption units indicated at 18,20 that establish a common cryptosystem. In the example provided, it will be assumed that the encryption units 18,20 implement an elliptic curve cryptosystem with established underlying curve parameters and seed point P on that curve.

Each of the correspondents 12 also includes a memory 22 in which is embedded a respective secret integer d used as a long term private key by the correspondent 12 for multiple transactions. The correspondent 14 has a public key $Q_B$ and a number of precomputed values of $dQ_B$ is stored in an addressable memory 24 on the correspondent 12 to facilitate signature A number generator 26 is included on each card to generate a statistically unique but unpredictable integer at the start of each session for use as a short term private key that will change at each transaction.

The correspondent 14 similarly includes a memory 28 having a databank which stores the respective long term private key d of each of the correspondents 12 and correlates it to the identity of the respective one of the correspondents 12.

To Initiate a verification protocol, one of the correspondents 12 formulates a message m and generates a random integer k from the generator 26 which acts as a short term private key during the transmission session. Using the seed point P, it computes a session key r which corresponds to kP. kP is in fact a point on the underlying curve with coordinates (x,y).

A first signature component e is generated by encrypting a message m using the binary representation of the x coordinate so that $e=E_x(m)$.

A second signature component e' is generated by hashing the x coordinate of the session key r such that $e'=h(x)$. A suitable cryptographic hash function is used such as the secure Hash Algorithm (SHA-1) proposed by the U.S. National Institute for Standards and Technology (NIST).

A third signature component s is generated of the general form $s=ae+k \pmod{n}$ where a is the long term private key, e is a value derived by hashing a message string and k is the short term private key. In this embodiment the signature component s has the specific form $$s=d.h(dQ_B//e')+k \pmod{n}$$

where n is the order of the underlying curve. The signature component s is obtained by retrieving the precomputed value of $dQ_B$ from memory 24 of correspondent 12 and concatenating it with the hash value of x and then hashing the result.

A signature including signature components s, e and e' is then forwarded to the correspondent 14. Upon receipt the correspondent 14 retrieves the long term private key d from the databank 28 based on the indicated identity of the correspondent 12 and together with its own public key, $Q_B$ and the received component e' computes the hash $h=dQ_B//e'$. From that and the signature component s, a value k' can be obtained which should correspond to k.

Utilizing the computed value of k and the seed point P, a function associated with the computed value of the short term key, namely the value of the x coordinate of kP, x', can be obtained. The computed value of x' is then hashed and a comparison made to verify that the resultant value of the hash corresponds with the received value of e'. At that stage, verification of the correspondents has been obtained and the only exponentiation required is the initial computation of kP.

The computation of the session key r and the subsequent use of a portion of that session key enables a secure authorization to be returned by the correspondent 14. Having computed the value of the coordinate x, the correspondent 14 can then compute the coordinate y and use it to encrypt a message m' as authorization. Thus the correspondent 14 responds to the correspondent 12 by forwarding a message including Ey(m'). Upon receipt, the correspondent 12 knows they coordinate of the session key R and can recover the message m' that conveniently includes a challenge. The correspondent 12 decrypts the message and returns the challenge to the correspondent 14 so that the correspondents are then verified and synchronized. Further messages may then be transferred between the correspondents 12,14 using the session key r as the encryption key.

It will be seen, therefore, that in the above protocol, a pair of keys are utilised and the correspondent 14 retains control of one of the keys that provides a long term private key and utilizes these to recover the short term session key computed by the correspondent 12. The recovered short term key can then be used for verification with other transmitted signature components, e.g. by checking e'.

Alternatively, the structure of the recovered value of the key could be indicative of verification, for example, by the pattern, number or distribution of digits so that the recovered value may be compared with predetermined parameters for verification. By virtue of the relationship between the recovered component and the information forwarded, the other portion of the session key can be utilized to reply and establish synchronization.

In this embodiment, it will be noted that the signature verification is performed in a computationally expedient manner without exponentiation and so may be performed relatively quickly.

It will also be noted that the system 10 may function as a public key encryption system between the correspondents 12 or correspondents 12, 14 but where rapid verification is required, it may use the attributes of a symmetric key protocol.

Figure 3:
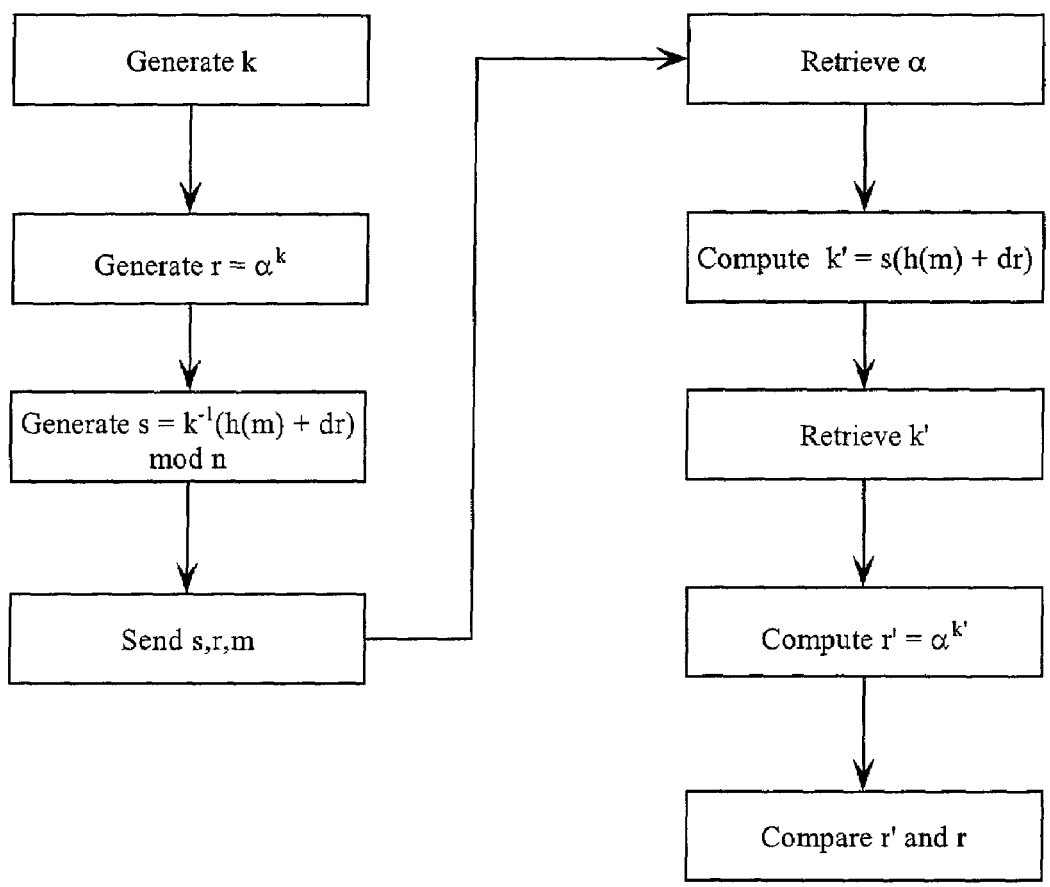
FIG. 3 is a schematic flow chart of an alternative protocol.

As will be exemplified below, alternative signatures may be used and generally any El Gamal signing equation may be used. An alternative embodiment of signature verification may be implemented using the DSS signature protocol, as shown in FIG. 3. In this protocol, a short term public key r is derived by expowienting the group generator $\alpha$ with a random integer k, i.e. $r=\alpha^k$. (If an elliptic curve cyptosystem is utilised, then the exponentiation is performed by a k fold addition of the point P so that r=kP).

With the DSS protocol, the signature component s is of the form $$s=k^{-1}(h(m)+dr) \pmod{n}$$

where d is a long tern private key and m is the message. The values of signature components s, r and the message m is forwarded by the correspondent 12 to the correspondent 14.

Correspondent 14 shares the long term private key d and so can retrieve the short term private key k from the identity $k=s^{-1}(h(m)+dr)$.

As the values of r, m and s are sent and, d is known by the correspondent 14, k can be computed.

As noted above, k can be arranged to have a specific structure, such as a specific pattern or a certain number of 1's and this may be used as verification. Alternatively, the verification may be checked by computing a value of r from the recovered k (i.e. $r=\alpha^k$) and comparing it with the transmitted r. This step requires an exponentiation and therefore is computationally more demanding but may be utilised where desirable.

Again, by sharing the long tern private key d, a verification can be performed in a simple yet effective manner by extracting the short term private key, k.

In each of the above examples, the signature verification is performed between a pair of correspondents. The characteristics of the protocol may be utilised to verify a signature issued by a certifying authority CA, such as a bank, constituted by correspondent 14.

In this embodiment, the correspondent 14 receives a certificate purporting to have been issued by it. The correspondent 14 verifies the authenticity of the certificate using the long term private key d to extract the short term private key k. The structure of the private key k can then be checked or the key k used to derive information relating to the short tern public key, r, included in the message. Again, verification can be obtained without extensive computation in an expedient manner and allows the verification of certificates received by the correspondent 14, i.e. a bank or financial institution.

This embodiment may be exemplified using the digital signature algoritbm,DSA, which is a special case of the El Gamal signature scheme. For key generation in the El Gamal signature scheme, each correspondent A and B creates a public key and corresponding private key. In order to set up the underlying cryptosystem in a group $F_p$, the entities A and B select primes p and q such that q divides p−1. A generator g is selected such that it is an element of order q in $F_p$ and the group used is $\{g^0, g^1, g^2, \ldots g^{q-1}\}$.

In the digital signature algorithm (DSA) key generation is performed by selecting a random integer d in the interval [1, q−1] and computing a long term public key $y=g^d$ mod p. The public key information is (p, q, g, y) and the long term private key is d, while in the general El Gamal scheme the public key information is (p, g, y) and the private key is d.

In a DSA signature scheme the signature components r and s are given by:

$$r=(g^k \bmod p) \bmod q; \text{ and}$$

$$s=k^{-1}(h(m)+dr) \bmod q$$

where typically:
d is a random integer, the signors long term private key and is typically 160-bits;
p is typically a 1024-bit prime;
q is a 160-bit prime where q divides p−1;
g is the generator such that $y=g^d$ mod p;
h(m) is typically a SHA-1 hash of the message m;
k is a randomly chosen 160-bit value for each signature; and
the signature for m is the pair (r, s).

Normally to verify A's signature (r, s) on the message m, the recipient B should obtain A's authentic public key information (p, q, g, y), and verify that 0<r<q and 0<s<q. Next the values $w=s^{-1}$ mod q and h(m) are computed. This is followed by computing $u_1=w \, h(m)$ mod q and $u_2=r \, w$ mod q and $v=(g^{u1}y^{u2} \bmod p) \bmod q$. The signature is accepted if and only if v=r. It may be seen therefore that in some cases if the owner of the signature wants to verify its own signature at a later stage it may be time consuming to retrieve the public key information and perform the steps above, which include a pair of exponentiations.

Figure 4:
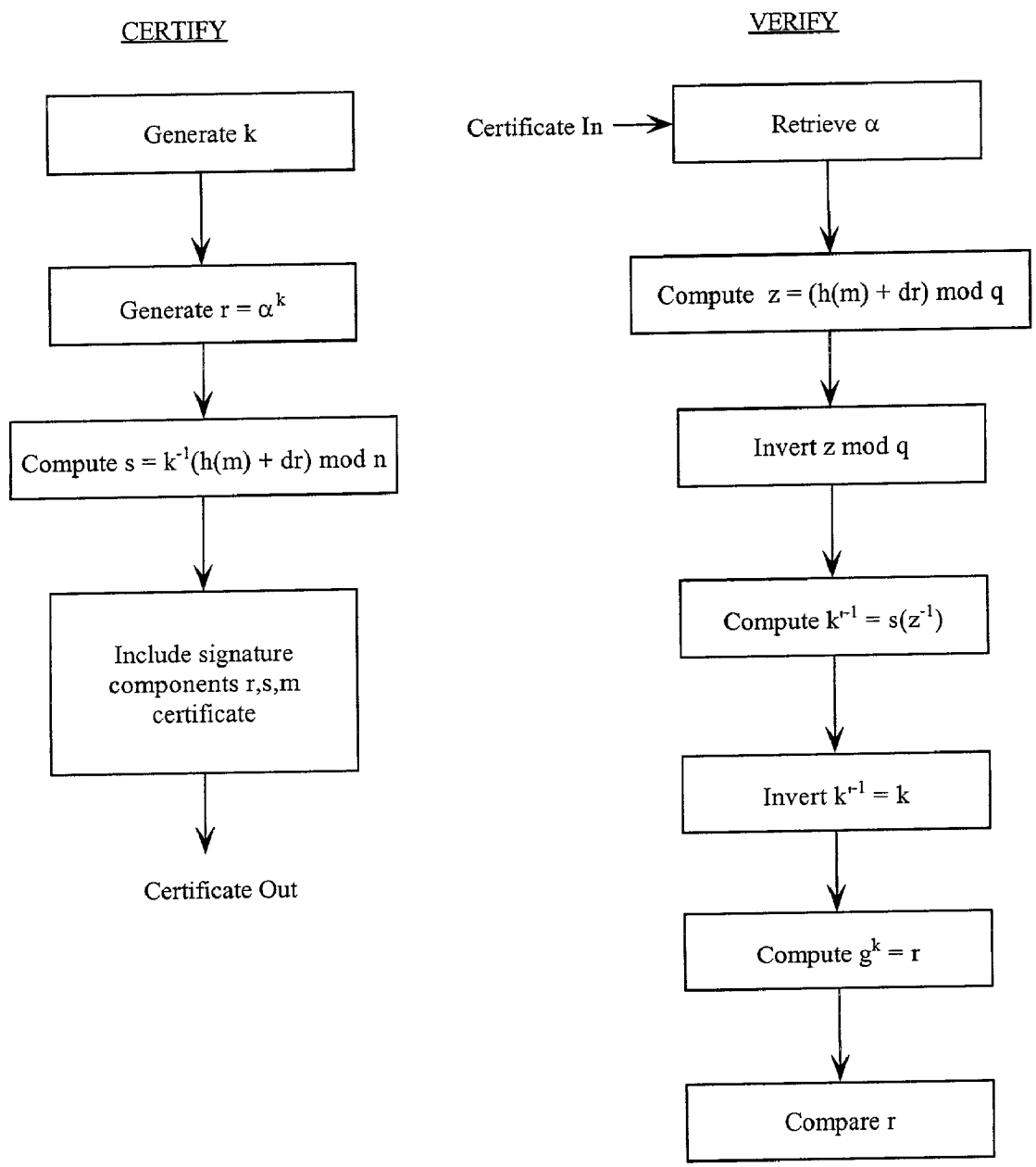
FIG. 4 is a schematic flow chart of a further protocol.

A fast signature verification by the certifying authority CA may be implemented as shown in FIG. 4 using the long term private key d of the certifying authority as the verifier. In this case the original signor has knowledge of p, q, g, y, h(m), r and s. Thus the verifier need only recover the short term private key k used in the signature and verify the value of k thus obtained in order to verify the signature. The verifier thus calculates z=(h(m)+dr) mod q . The value $z^{-1}$ is calculated by inverting z mod q and used to compute $k'^{-1}=s(z^{-1})$ mod q. k' may be calculated by inverting $k'^{-1}$ mod q. The verifier then evaluates $r'=g^{k'}$ mod p mod q and verifies that k=k'. Thus it may be seen that this verification step uses the long term private key d rather than the long term public key y to avoid exponentiation. Naturally many of the calculations above can be sped up using pre-computed tables.

Figure 5:
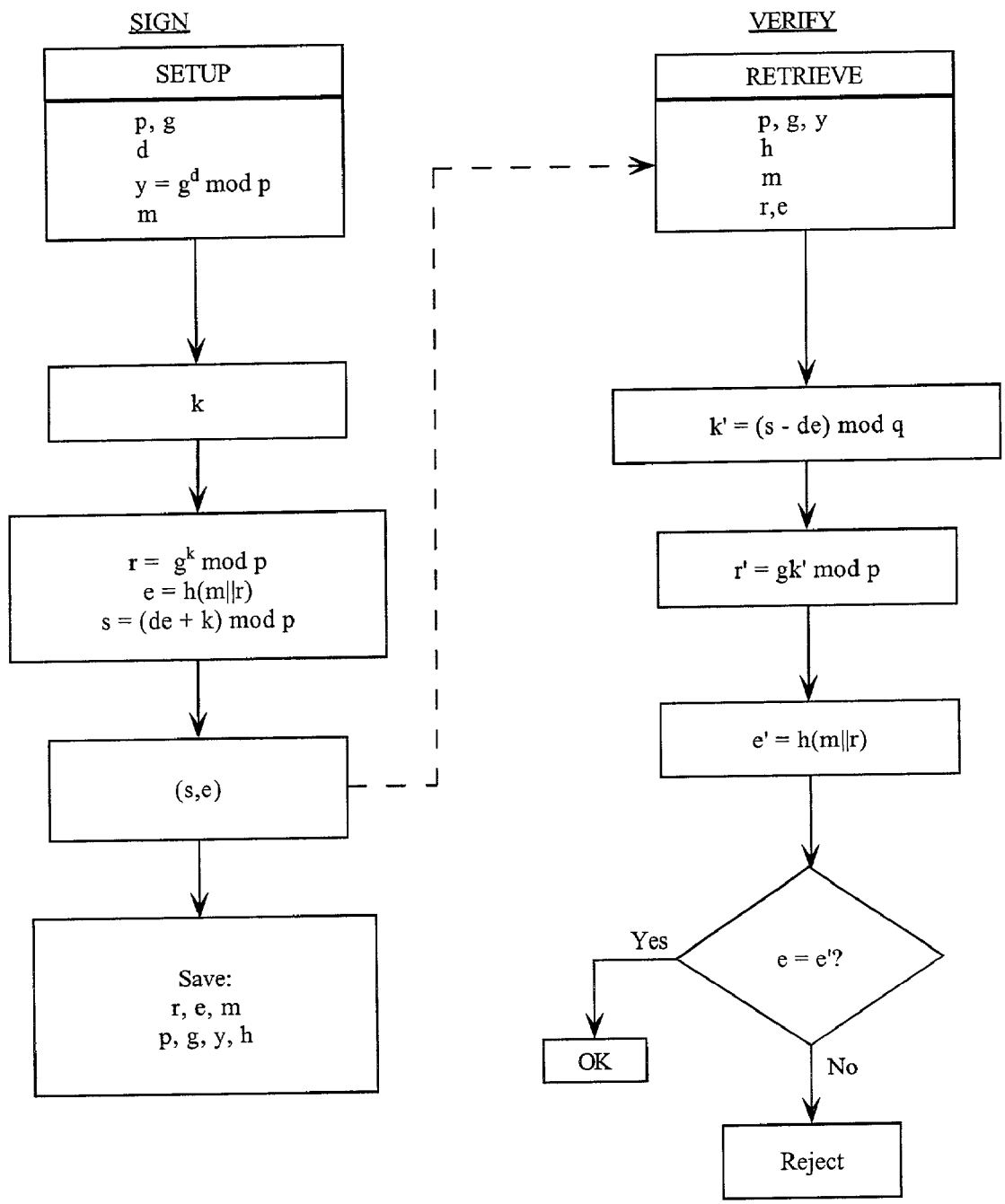
FIG. 5 is a schematic flow chart of a further protocol.

An alternate El Gamal signature method is shown in FIG. 5 and has signature components (s, e) where:

$$r=g^k \bmod p;$$

$e=h(m\|r)$ where $\|$ indicates concantenation; and $$s=(de+k) \bmod p$$

where p is a large public prime, g is a public generator, m is a message, h is a hash function, d is a long term private key, $y=g^d$ mod p is the corresponding long term public key and k is a secret random integer used as a short term private key.

To generate a certificate, the correspondent 14 signs a message m containing the identity of one of the correspondents 12 and that correspondents public key. The message is signed using the long term public key and a short term session key k of the correspondent 14 and a certificate issued to the correspondent 12 including the signature components s,e. The public information is retained by the correspondent 14. The certificate may be used by the correspondent 12 and verified by recipients using the public key of correspondent 14.

When a certificate is presented to the correspondent 14, a rapid verification may be obtained using the long tern private key d.

In fast signature verification using the private key d the public information of p, g, y, h, m, r, e and private key d is known by the verifier. Thus the verifier need only recover the short term private key k and verify k in order to verify the signature. The verifier calculates k'=(s−de) mod p, $r'=g^{k'}$ mod p and e'=h(m∥r'e). If e=e' this verifies k=k'. Only one exponentiation is required in this verification to facilitate the process. Alternatively the characteristics of the recovered value of k may be sufficient to satisfy verification as discussed above.

Thus it may be seen that a particular advantage of the present invention is where a signor signs data which for example may reside on the signors computer. This can be later verified without use of the correponding public key, instead the signor can use its private key to verify the data. This is also very useful for some applications with limited computational power such as smartcards.

In a data communication system that includes a certifying authority, the certifying authority (CA) or key distribution centre would sign data frequently before it is installed into the various communications systems and then could verify the signatures later. Thus the CA does not require the public key information to verify the signatures but simply uses the long term private key to verify, as all the other parameters are stored within the secure boundary of the signor. It will also be noted that as the long term private key d is used it is not necessary to retain the short tern private key k so that the overhead associated with the system is minimised.

A further application is in the verification of software such in pay-per-use software applications. A request for access to a server may be controlled by a certificate issued by the server and presented by the user of the software. The authenticity of the certificate may then be verified using the servers private key as described above in an expeditious manner.

While the invention has been described in connection with specific embodiments thereof and in specific uses, various modifications thereof will occur to those skilled in the art without departing from the spirit of the invention as set forth in the appended claims. For example, in the above description of preferred embodiments, use is made of multiplicative notation however the method of the subject invention may be equally well described utilizing additive notation. It is well known for example that the elliptic curve algorithm equivalent of the DSA, i.e. ECDSA is the elliptic curve analog of a discrete logorithm algorithm that is usually described in a setting of $F_p^*$, the multiplicative group of the integers modulo a prime There is correspondence between the elements and operations of the group $F_p^*$ and the elliptic curve group $E(F_q)$. Furthermore, this signature technique is equally well applicable to functions performed in a field defined over $F_2$.

The present invention is thus generally concerned with an encryption method and system and particularly an elliptic curve cryptograhic method and system in which finite field elements is multiplied in a processor efficient manner. The cryptographic system can comprise any suitable processor unit such as a suitably programmed general-purpose computer.

The invention claimed is:

1. A method of establishing a session key between a pair of correspondents in a data communication system, each of said correspondents sharing secret information, said method comprising the steps of:
    a) one of said correspondents generating additional secret information and deriving therefrom a session key;
    b) said one of said correspondents combining said secret information and said additional secret information in a signal algorithm to provide a first signature component;
    c) said one of said correspondents deriving a second signature component from said secret information;
    d) said one of said correspondents transferring said first and second signature components to the other of said correspondents;
    e) said other of said correspondents using said secret information to obtain said additional secret information from said first signature component and generating a said session key from said secret information and said additional secret information; and
    f) said other of said correspondents verifying said second signature component by operating upon said session key obtained at said other of said correspondents to obtain a value corresponding to said second signature component and comparing such value with said second signature component.

2. A method of claim 1 wherein said first signature component includes public information associated with said other correspondent and said other correspondent utilizes said public information to obtain said additional secret information.

3. A method according to claim 2 wherein said secret information and public information are combined in said signature algorithm and such combination is precomputed and stored by said one correspondent.

4. A method according to claim 3 wherein said combination is the product of said secret information and said public information.

5. A method according to claim 1 wherein a portion of said secret information is utilized to provide said second signature component.

6. A method according to claim 5 wherein said secret information represents the coordinates of a point on an elliptic curve and said portion is one of said coordinates.

7. A method according to claim 5 wherein said portion is hashed by a secure hash function to provide said second signature component.

8. A method of establishing a session key between a first correspondent and a selected one of a plurality of second correspondents connected to said first correspondent, said method comprising providing each of said second correspondents a respective secret information; storing each said secret information at said first correspondent to associate each said stored secret information with a respective second correspondent; said selected one of said second correspondents combing said secret information and additional secret information in a signature algorithm to provide a first signature component, said additional secret information being used by said selected correspondent to generate a session key; said selected one of said second correspondents deriving a second signature component from said secret information; said first correspondent receiving from said selected one of said second correspondents said first and second signature components; said first correspondent retrieving said stored secret information associated with said selected one of said second correspondents and using said secret information to obtain said additional secret information and generating said session key from said secret information of said selected one of said second correspondents and said additional secret information; and said first correspondent verifying said second signature component by operating upon said session key obtained at said first correspondent to obtain a value corresponding to said second signature component and comparing such value with said second signature component.

9. A method of claim 8 wherein said first signature component includes public information associated with said first correspondent and said first correspondent utilizes said public information to obtain said additional secret information.

10. A method according to claim 8 wherein a portion of said secret information is utilized to provide said second signature component.

11. A method according to claim 10 wherein said secret information represents the coordinates of a point on an elliptic curve and said portion is one of said coordinates.

12. A method according to claim 10 wherein said portion is hashed by a secure hash function to provide said second signature component.

* * * * *